United States Patent
Poling

(10) Patent No.: US 11,364,481 B2
(45) Date of Patent: Jun. 21, 2022

(54) COAL ASH TREATMENT SYSTEM AND METHOD

(71) Applicant: Mercury Capture Intellectual Property, LLC, Lousville, KY (US)

(72) Inventor: Christopher L. Poling, Bel Air, MD (US)

(73) Assignee: MERCURY CAPTURE INTELLECTUAL PROPERTY, LLC, Louisville, KY (US)

(*) Notice: Subject to any disclaimer, the term of this patent is extended or adjusted under 35 U.S.C. 154(b) by 445 days.

(21) Appl. No.: 15/877,732

(22) Filed: Jan. 23, 2018

(65) Prior Publication Data

US 2018/0154336 A1 Jun. 7, 2018

(51) Int. Cl.
*B01J 20/34* (2006.01)
*B01J 20/20* (2006.01)
(Continued)

(52) U.S. Cl.
CPC ......... *B01J 20/3416* (2013.01); *B01J 20/20* (2013.01); *B01J 20/3483* (2013.01);
(Continued)

(58) Field of Classification Search
CPC .... B01J 20/3416; B01J 20/20; B01J 20/3483; C01B 18/065; C10L 9/08
See application file for complete search history.

(56) References Cited

U.S. PATENT DOCUMENTS

| | | |
|---|---|---|
| 5,306,475 A | 4/1994 | Fichtel et al. |
| 5,405,812 A | 4/1995 | Bruegendick |

(Continued)

FOREIGN PATENT DOCUMENTS

| | | |
|---|---|---|
| AU | 2014200531 A1 | 1/2014 |
| DE | 19630719 A1 | 2/1998 |

(Continued)

OTHER PUBLICATIONS

Extended European Search Report issued by the European Patent Office for European Patent Application No. 19152939.5 dated Aug. 6, 2019.

(Continued)

*Primary Examiner* — James A Fiorito
(74) *Attorney, Agent, or Firm* — Moore & Van Allen, PLLC; Henry B. Ward, III

(57) ABSTRACT

A system and method for producing a modified coal ash involves collecting a bulk quantity of such coal ash, generally after it has been produced or landfilled, or is otherwise at temperatures closer to ambient, as opposed to power plant operational temperatures. In one possible implementation, the method herein involves removing carbon from the coal ash, such removal occurring by exposing the carbon to indirect heat, that is, externally-applied heat. For coal ashes with higher ash content. This removal is accomplished by subjecting the coal ash stream to heat, in one implementation, ranging between 850° F. and 1200° F., and such heat exposure occurring from about 10 minutes to about 30 minutes. The range of exposure time for the coal ash is determined so as to reduce the LOI from its initial level to a level acceptable for intended re-use or recycling. In one application, the LOI of carbon in the ash is reduced to 3% or less carbon. Upon completion of the range of the exposure time, the coal ash stream is removed from the sublimation heat, thereby forming a modified coal ash.

26 Claims, 1 Drawing Sheet

(51) Int. Cl.
*C10L 9/08* (2006.01)
*C04B 18/06* (2006.01)
*B01D 53/10* (2006.01)

(52) U.S. Cl.
CPC ............. *C04B 18/065* (2013.01); *C10L 9/08* (2013.01); *B01D 53/10* (2013.01); *B01D 2253/102* (2013.01); *B01D 2257/60* (2013.01); *B01D 2258/0283* (2013.01); *B01D 2258/0291* (2013.01); *C10L 2290/52* (2013.01); *C10L 2290/543* (2013.01); *C10L 2290/565* (2013.01)

(56) References Cited

U.S. PATENT DOCUMENTS

| | | | |
|---|---|---|---|
| 5,556,447 | A | 9/1996 | Srinivasachar et al. |
| 6,036,484 | A | 3/2000 | Career et al. |
| 2005/0089460 | A1 | 4/2005 | Tranquilla |
| 2011/0024680 | A1 | 2/2011 | Via et al. |
| 2015/0038321 | A1* | 2/2015 | D'Amico ................ B01J 20/20 502/56 |

FOREIGN PATENT DOCUMENTS

| | | |
|---|---|---|
| EP | 0908673 A1 | 4/1999 |
| JP | 5973647 B2 | 8/2016 |
| WO | 9950180 A1 | 10/1999 |
| WO | 2004108621 A2 | 12/2004 |
| WO | 2011024680 A1 | 3/2011 |
| WO | 2012024511 A1 | 2/2012 |

OTHER PUBLICATIONS

Office Action issued by the Brazilian Patent Office for Brazilian Patent Application No. BR112014022502-8 dated Aug. 29, 2019.
Extended European Search Report issued by the European Patent Office for corresponding European Patent Application No. 19152931.2 dated Apr. 25, 2019.
Partial European Search Report issued by the European Patent Office for corresponding European Patent Application No. 19152939.5 dated Apr. 25, 2019.
Scott D Ziegler et al: "Fly Ash Carbon Separation and ammonia removal in Florida", Cement Industry Technical Conference (CIC), 2013 IEEE-IAS/PCA, IEEE, Apr. 11, 2013 (Apr. 11, 2013), pp. 1-7, XP032418747, DOI: 10.1109/CITCON.2013.6525275 ISBN: 978-1-4673-5552-0.
European Office Action issued for Application No. 19152931.2 dated Aug. 18, 2020.
Indian Examination Report issued for Application No. 201924002222 dated Aug. 11, 2020.
Indian Examination Report issued for Application No. 201924002333 dated Aug. 6, 2020.
Written Opinion issued by the Brazilian Patent Office for Brazilian Application No. BR112014022502-8, dated Oct. 13, 2020.

* cited by examiner

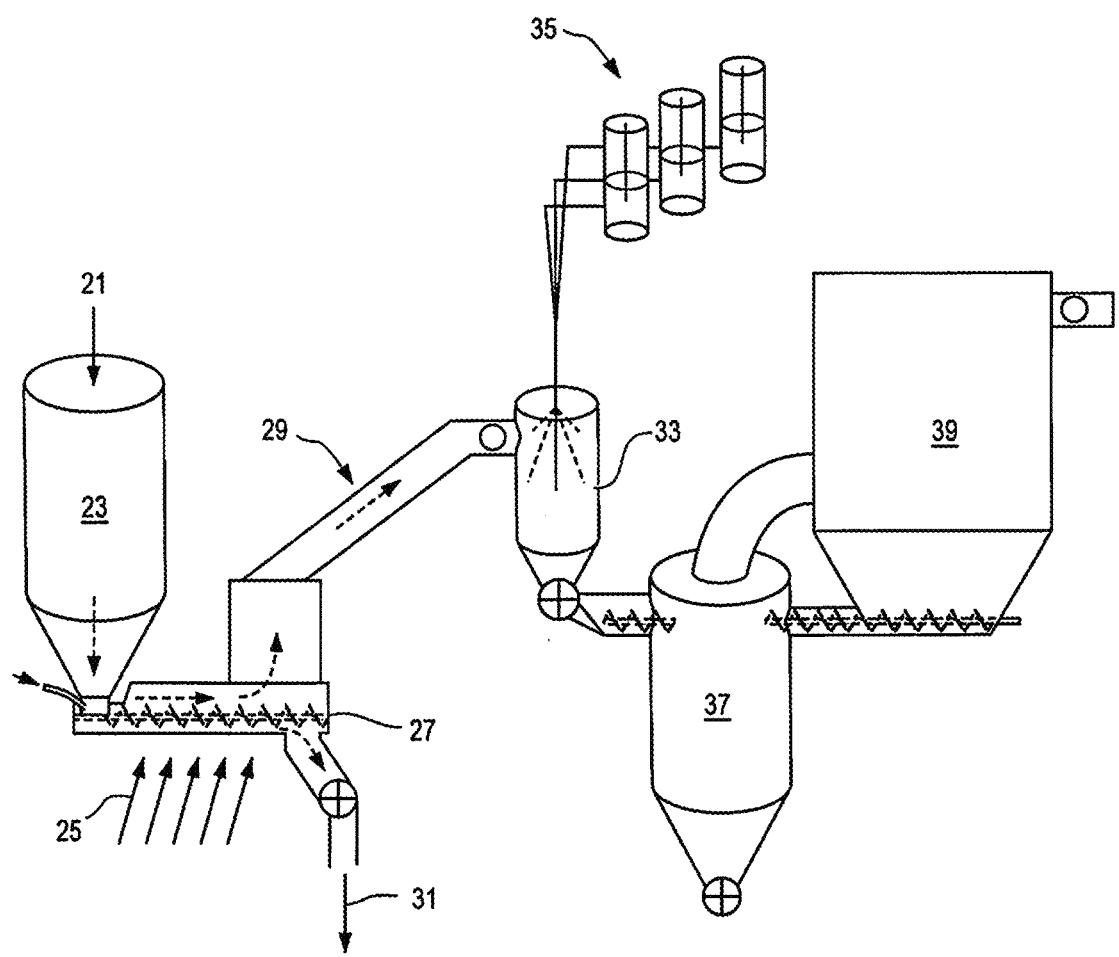

COAL ASH TREATMENT SYSTEM AND METHOD

FIELD

The present disclosure relates to systems and methods for treatment of coal ash, and more particularly, to treatments resulting in a modified coal ash.

BACKGROUND

Industrial processes, such as operation of coal-fired power plants, generally produce coal combustion byproducts or coal combustion residues (collectively "CCR"). CCRs are materials which are generally landfilled, ponded or recycled/reused. CCRs may have characteristics or constituents, or may exhibit qualities, which make such materials unsuitable for recycling or reuse, leading to their being landfilled or ponded instead. These characteristics or qualities may include moisture, mercury, selenium, carbon, ammonia, chlorides, particle size, organics, hydrocarbons or other variables.

Coal ash is a type of CCR which is produced by coal combustion. Among the types of coal ash produced in coal combustion are coal fly ash and coal bottom ash. It is estimated that several million tons of coal ash are landfilled or ponded each year in the United States. It is further estimated that over 100 million additional tons is already in landfills or ponds. These landfilled or ponded ashes may not be suitably located in relation to local communities and ground water ecosystems. Furthermore, costs to relocate landfilled or ponded CCR may be significant. In addition, the relocation of the CCR may not alter or address the potential regulatory matters which may be associated with such CCRs. Mercury, for example, will continue to release from any surface exposed to atmosphere.

In view of challenges posed by landfilling or ponding of CCRs, it is often preferred or desirable to attempt to recycle or reuse CCR when in the form of coal ash. Industrial processes which may benefit from using recycled coal ash include producing concrete, ready mix, block, pavers, and the like. One potential application is to use coal ash in concrete as a supplementary cementitious material. There are, however, challenges to recycling or reusing coal ash and other CCRs in certain industrial processes, because of the potential unsuitable qualities or characteristics of the CCR, some of which were outlined above.

Thus, coal ash containing mercury, carbon, excess moisture, ammonia, and potentially other heavy metals, often presents a recycling or reuse challenge. Coal fly ash containing more than 65 ppm ammonia is often not able to be used by the concrete and ready-mix industry without accounting for potential exposure issues. Coal fly ash with more than 6% carbon (measured as % Loss-on-Ignition or "LOI") is not generally used by the concrete or ready-mix industries due to the increased potential for foam index issues, air entrainment issues, and spotting issues. Coal fly ash with more than 2% moisture is not generally used in concrete ready-mix industry applications due to ASTM specifications prohibiting such practice. In short, all of these issues inhibit the increased recycling and reuse of coal ash. Furthermore, to the extent such recycling challenges lead to more landfilling or ponding of coal ash or other CCRs, the inability to recycle or reuse CCRs increases potential regulatory or environmental issues associated with landfilling or ponding.

Landfilled or ponded coal combustion byproducts or coal combustion residues, such as coal ash, may be recycled or regenerated through various processes referred to generally as "carbon burnout." These techniques, however, have various drawbacks and disadvantages. The carbon burnout process typically is limited to processing dry materials with a carbon content in excess of 9%. Such burnouts often do not account for the presence of mercury, which may be released into the atmosphere along with ammonia in the form of NOx. Current carbon burnout processes often require significant stationary equipment and structures, which make these processes cost prohibitive for potential industry applications, such as when sought to be used as supplementary cementitious materials.

Furthermore, while such carbon burnout may address excess carbon or limit certain contaminants, it generally does not address heavy metals, such as mercury, which may remain in the gas stream after carbon burnout, requiring the counterproductive further application of hydrogen activated carbon or PAC in order to recapture the heavy metals released during the carbon burnout process itself. Carbon burnout processes often generate a source of NOx, which has the disadvantage of contributing to greenhouse gas emissions, or may release mercury. In fact, in certain cases, the amount of NOx or mercury generated by the carbon burnout process may be similar or equivalent to the amount of NOx or mercury which was sought to be eliminated by measures taken proximate to the point of the coal combustion itself. In such cases, the NOx or mercury emission point has simply moved from the power generator or a coal combustion source, and has been concentrated at the carbon burnout facility downstream thereof.

In view of the foregoing, it would be advantageous to develop treatment systems and methods for CCR in the form of coal ash, with such treatments or methods resulting in a modified coal ash suitable for use in subsequent industrial processes.

SUMMARY

Treatment systems and methods for spent activated carbon, spent powdered activated carbon (PAC), and/or coal combustion residue (CCR), such as coal ash, are disclosed herein. In one illustrative embodiment, the treatment systems and methods disclosed herein relate to the removal of mercury and other heavy metals from spent activated carbon which has previously been used for heavy-metal pollution reduction. In another illustrative embodiment, the treatment systems and methods disclosed herein relate to the removal of mercury and other heavy metals from CCRs or byproducts such as fly ash, bottom ash, and/or synthetic gypsum. Both fly ash and flue-gas desulfurization (FGD) residues have been identified as CCRs with the potential to have increased mercury and/or other pollutant concentrations.

In still another implementation, a process for producing a modified coal ash involves collecting a bulk quantity of such coal ash, generally after it has been produced or landfilled, or is otherwise at temperatures closer to ambient, as opposed to power plant operational temperatures. The collected coal ash will generally have 12% LOI of carbon or less.

According to the exemplary process, a coal ash stream is formed from the collected coal ash, and at least 50% of the carbon is removed from the coal ash, such removal occurring in a non-self-sustaining sublimation of the carbon. This sublimation is accomplished by subjecting the coal ash stream to a sublimation heat, such heat ranging between 850° F. and 1150° F., and such heat exposure occurring from about 10 minutes to about 30 minutes.

The range of exposure time for the coal ash is determined so as to reduce the LOI from its initial level to 3% of carbon or less. Upon completion of the range of the exposure time, the coal ash is removed from the sublimation heat, thereby forming a modified coal ash. As a result of the foregoing process, the modified coal ash is suitable for use in the cement or concrete industry, such as using the modified coal ash as a supplementary cementitious material or kiln feed.

In one possible implementation, the coal ash may comprise either coal fly ash or coal bottom ash. In the case of coal bottom ash, the particles generally are sized at greater than 80 microns. Accordingly, one possible process step would involve pulverizing or screening either the bottom ash or the coal ash particles before or after they have gone through the various treatment steps above to become modified coal ash. The pulverizing or screening operations may result in 80% of the modified coal ash particles passing through a 45 micron screen.

In one variation of the processes according to this disclosure, the bulk quantity of coal ash has a heavy metal associated therewith, and the process would involve steps of separating the heavy metal from the coal ash by volatilizing the mercury while subjecting the coal ash to the sublimation heat of 850° F. to 1200° F. The heavy metal, once volatilized, may be treated with either alkaline-earth metal sulfide or alkaline-earth metal polysulfide.

In other possible processes according to this disclosure, coal ash subject to the above treatment steps is limited in its exposure to air to between 500 and 3000 cubic feet of air per minute, during the time of exposure of the coal ash to the sublimation heat.

The process according to this disclosure, in certain implementations, may be accomplished by means of a thermal desorber, such as a rotary volatilization vessel. The collected coal ash is inserted as a stream into such rotary volatilization vessel and undergoes exposure to the sublimation heat mentioned previously. The rotary volatilization vessel may comprise either a rotary kiln or a rotary calciner.

The process according to this disclosure may also involve subjecting the coal ash stream to a second heat range in the form of a temperature range of between 450° F. to 750° F., such heat being sufficient to transform ammonia, which may be present in the coal ash stream, into a gas. Exposure to the gasifying heat in the range of 450° F. to 750° F. may, in certain implementations, range for a time period between 10 minutes to 20 minutes, the range of exposure being selected so that the resulting modified coal ash has a reduced ammonia content of 60 PPM or fewer.

A system for producing a modified coal ash, according to the present disclosure, may make use of a coal ash storage container, which has a feed mechanism for delivering a coal ash stream therefrom. Coal ash stream may subsequently, either directly or indirectly, enter a rotary calciner having an inlet in communication (directly or indirectly) with the feed mechanism of the coal ash storage container. According to one implementation, the calciner has multiple, independent heat zones, the multiple independent heat zones being arranged between the calciner inlet and its outlet, thereby exposing the coal ash stream to indirect heat while in the calciner, such heat potentially being varied between the heat zones, to include either a heat sufficient to sublimate the carbon, a heat for gasifying ammonia, a heat for volatilizing mercury, or one or more of the foregoing alone or in combination. The calciner in certain implementations may have a variable discharge rate ranging between 5 to 50 tons per hour.

In one possible variation of the system of the present disclosure, a treatment unit may be operatively associated with the desorber such as volatilizing vessel. The treatment unit may be connected to be in air (that is, pneumatic) communication with the rotary calciner. When the calciner is volatilizing heavy metal off of coal ash received therein, the treatment unit receives a stream of the volatilized heavy metal in a treatment chamber defined in the treatment unit. A treating solution, such as an alkaline-earth metal sulfide or polysulfide, may be inserted into the treatment chamber through an inlet in sufficient amounts to contact the volatilized heavy metal and form heavy metal precipitate. Thus, the system not only may be used for reducing the LOI of carbon or the parts per million of ammonia contained in coal ash, but may also reduce the amount of mercury, and treat the resulting mercury to form a heavy metal precipitate.

These and other aspects of the disclosure may be understood more readily from the following description and the appended drawings.

BRIEF DESCRIPTION OF THE DRAWINGS

An embodiment of the activated carbon and coal combustion residue treatment system and method is illustrated in the FIGURE of the accompanying drawing which is meant to be exemplary and not limiting, in which like references are intended to refer to like or corresponding parts, and in which:

FIG. 1 illustrates a diagram of an embodiment of an apparatus and related methods for treating spent powdered activated carbon (PAC) and/or coal combustion residues (CCRs), including residues in the form of coal ash.

DETAILED DESCRIPTION

Detailed embodiments of the present invention are disclosed herein, however, it is to be understood that the disclosed embodiments are merely exemplary of the invention, which may be embodied in various forms. Therefore, specific functional details disclosed herein are not to be interpreted as limiting, but merely as a basis for the claims and as a representative basis for teaching those skilled in the art to variously employ the present invention.

A treatment system and method for treating and/or reducing pollution from powdered activated carbon (PAC) and/or coal combustion residues (CCRs) according to an illustrative embodiment is described with reference to FIG. 1. As illustrated in FIG. 1, spent PAC and/or one or more CCR(s) 21 may be collected from a particulate collection system, for example, a baghouse or an electrostatic precipitator (ESP), and transferred to a storage unit 23, for example, a silo. From the storage unit the spent PAC and/or CCR(s) are transferred to a volatilization vessel or zone 25. As illustrated in FIG. 1, the spent PAC and/or CCR(s) are transferred to or through the volatilization vessel 25 via a metering screw 27. It should be appreciated by those skilled in the art that the exact configuration of the conveying mechanism, whether by metering screw or other means, and the configuration of the volatilization zone or vessel, as well as their spatial relation to each other, may be varied depending on the particular application, and so means or method of transferring the spent PAC and/or CCR(s) to the volatilization vessel beyond that illustrated may be used.

To volatilize the mercury and/or other heavy metals captured in the spent PAC and/or CCR(s), heat is added to the spent PAC and/or CCR(s), in this version in the volatilization zone 25. For example, mercury's boiling point is about three hundred fifty-six and fifty-eight hundredths (356.58) degrees Celsius or about six hundred seventy-three and eight hundred forty-four thousandths (673.844) degrees Fahrenheit, after which point mercury exists as a gas. Testing has shown that various forms of mercury will volatilize at much lower temperatures beginning as low as one hundred (100) degrees Celsius and be measured in a mercury analyzer.

In an illustrative embodiment, heat may be added to the spent PAC and/or CCR(s) at the metering screw 27, and/or at a volatilization vessel surrounding or following the metering screw. The mercury and other heavy metals captured in the spent PAC and/or CCR(s) will vaporize into a gas stream 29, generally combined with the inerted atmosphere, leaving a cleaned PAC and/or CCR(s) stream 31 that may be removed and/or recycled into the system. The application of heat may be varied to suit the particular industrial process or application. In one possible implementation, the amount of heat energy expended is tailored to be sufficient to separate the mercury from the spent PAC and/or CCR(s), without being so excessive as to waste energy. In some applications, a minimum desirable temperature to be applied is 356 degrees Celsius, which corresponds to the sublimation temperature (solid to vapor) for mercury, but again, it is possible that mercury separation from the spent PAC or CCR for some processes may be accomplished with lower temperatures down to 150 degrees Celsius, or may more advantageously occur at temperatures as high 500 degrees Celsius.

In an illustrative embodiment, waste heat or excess heat from one or more processes within the power plant, kiln, cooler, or other industrial process may be used to elevate the temperature of the spent PAC and/or CCR(s) to the point of causing the heavy metals to release from the spent PAC and/or CCR(s). In the absence of waste or excess heat, or if such heat is insufficient, a booster heat source, or any other suitable heat source, gas, electric, or otherwise, may be operatively associated with spent PAC and/or CCR(s). The potential for combustion of the PAC and/or CCR(s) exists at high temperatures. Therefore, when heating the spent PAC and/or CCR(s), in one preferred embodiment, the volatilization zone 25 should be an inert atmosphere, for example, an oxygen depletion zone containing an oxygen content of about two percent (2%) or less, or a suitable inerting gas.

In another illustrative embodiment, the spent PAC and/or CCR(s) may be heated to the point of carbon combustion. This will release any heavy metals including mercury contained therein into the gas stream which can be treated with the reagent chemicals. This also results in creating a residual combustion ash, which may be collected and utilized or disposed of.

The air stream or gas stream containing vaporized mercury and other heavy metals can then be transferred to a treatment unit. In an illustrative embodiment, a treatment unit 33 includes, but is not limited to, ductwork, chambers, and the like. A treating solution 35 is injected or sprayed into the air stream containing the vaporized mercury and/or other heavy metals, to thereby treat and at least partially remove mercury and/or other heavy metals from the air stream. The spray pattern, droplet size, spray rate, and other parameters of the treatment unit 33 are selected to achieve the mercury reduction levels sought for the particular industrial process. In an illustrative embodiment, the treating solution is an aqueous spray solution containing a water soluble alkaline-earth sulfide and/or polysulfide. In one embodiment, the alkaline-earth metal polysulfide may be either a magnesium polysulfide or a calcium polysulfide, and the alkaline-earth metal polysulfide may be present in the solution in an amount of about one percent (1%) to about twenty-nine percent (29%) in water. In another embodiment, the alkaline-earth metal polysulfide is a mixture of one or more magnesium polysulfides and one or more calcium polysulfides, wherein the polysulfides are present in the solution in an amount of about one percent (1%) to about twenty-nine percent (29%) in water.

It should be appreciated by those skilled in the art that the amount of the alkaline-earth sulfide and/or polysulfide in the treating solution can vary outside of the ranges listed above. In many applications, the economic goal may be to use as little of the alkaline-earth sulfide and/or polysulfide as operationally possible. For example, the amount of the alkaline-earth sulfide and/or polysulfide used can vary dependent upon the dispersion in the air stream, the velocity of the air stream, the concentration of mercury and other heavy metals in the air stream, and other parameters of the type.

In an illustrative embodiment, the treating solution may include one or more catalyst agents having a pH of about seven (7) or more, such as a suitable phosphate. However, it should be appreciated by those skilled in the art that depending on the pH of the PAC and/or CCR(s) and/or the air stream containing the vaporized mercury and/or other heavy metals, the catalyst agent may not be used.

In another illustrative embodiment, the treating solution may include one or more surfactants, dispersants, and/or hyperdispersants. In one embodiment, the surfactant, dispersant, and/or hyperdispersant is composed of one or more polyethylene oxide-polyethylene block co-polymers and/or the phosphate esters thereof. The addition of the surfactant, dispersant, and/or hyper dispersant to the treating fluid may be optional. When the surfactant, dispersant, and/or hyper dispersant is included, the surfactant, dispersant, and/or hyper dispersant may be provided in an amount sufficient to assist in maintaining the reaction agent or reagent in the treating fluid prior to reaction with the metal(s). Additionally, the treating solution may include the alkaline-earth sulfide and/or polysulfide, one or more surfactants, dispersants, and/or hyper dispersants, and one or more catalyst agents.

In an illustrative embodiment, upon treating the air stream with the treating solution the vaporized mercury and/or other heavy metals precipitate out of the air stream and the precipitate may be filtered out. The precipitate is the residue from the above-described treatment process and system, in the form of mercury and/or other heavy metals and contaminants. This residue may be collected or otherwise filtered out by any suitable means, in this implementation shown as a residue silo 37. In connection with handling the mercury or other contaminant residue, the collected mercury and/or other heavy metals can then be further processed, recycled or otherwise disposed of properly. A small particulate filter 39, shown downstream of the silo 37, can be used as part of the residue treatment process, and, in certain implementations, may be placed or otherwise configured to capture the heavy metal portion of the resulting gas stream. Similarly, other implements and processing equipment may be employed in connection with the residue formed by the treatment process, such that the mercury or other heavy metals are captured in dry form or in liquid form, such as a slurry, depending on the industrial process, goals or any number of parameters. The mercury or other heavy metal residue collected through this process may assume still further characteristics or form, depending on the application.

The remaining clean air is then exhausted to the atmosphere through a particulate collection system. Any residue which is further captured in the particulate collection system may be returned to the storage bin.

In an illustrative embodiment, the treatment system and method illustrated in FIG. 1 may be used to treat the spent PAC and/or CCR(s) on a continuous basis or a non-continuous basis to remove mercury and/or other heavy metals from the PAC and/or CCR(s) as the concentrations increase in the PAC and/or CCR(s). The non-continuous basis may be tailored to or in response to measurements of the amount of mercury and/or other heavy metals taken from one or more samples of the PAC and/or CCR(s).

In an illustrative embodiment, the volatilization vessel may take a variety of forms, including, but not limited to, ductwork, chambers, and other vessels of the type. The particulate collection system may be any of the variety of apparatus suitable for capturing, filtering, or otherwise collecting dust from industrial plants or power plants and other various operations. Given the variety of industrial plant or power plant configurations possible, it should be appreciated by those skilled in the art that the particulate collection system, as well as the apparatus or system for treating the spent PAC and/or CCR(s) may be operatively associated with one or more operations of the industrial plant or power plant capable of receiving material for treatment, at any number of suitable locations relative to the components of the industrial plant or power plant. In many possible implementations, the treatment apparatus will be operatively associated with the industrial process to receive the spent PAC and/or CCR(s) after their point of collection in the facility, and to return the cleaned PAC and/or CCR(s) before their point of introduction into the industrial process.

In one possible implementation, the treatment system and related method is used in connection with coal ash, such as coal fly ash or coal bottom ash, and various processing steps and related equipment are employed so as to produce modified coal ash suitable for use as a supplementary cementitious material. In such implementation, storage unit 23 is in the form of a coal ash storage container.

A bulk quantity of the coal ash is collected, and then stored in storage unit 23. The coal ash may be collected from any number of post-production process sources, such as after the coal ash has been generated by combustion of coal in a power plant, and preferably the coal ash is at a temperature at or closer to ambient, not at combustion temperatures associated with power plant operations. Coal ash may also be collected from a pond or a landfill in which it had been placed after being previously collected in a particulate collection system.

Coal ash is formed into a coal ash stream by suitable feeding from coal ash storage unit 23, by a conveying or feeding mechanism, such as a metering screw 27 shown in FIG. 1. The feed or conveying mechanism is adapted to deliver the coal ash stream from container 23 to volatilization vessel or zone 25. Although metering screw 27 is shown schematically in FIG. 1 as extending into heating zone 25, other configurations are likewise within the scope of this disclosure. In one possible arrangement, metering screw 27 comprises a conveying or feeding mechanism in the form of a screw-type feeder leading from storage bin 23, but such feeder does not extend into vessel 25 and instead delivers the coal ash stream to the input side or inlet zone of rotary volatilization vessel 25. Still other configurations for feeding coal ash from storage bin 23 to heat zone 25 are likewise within the scope of this disclosure, and such feeding mechanisms need not be limited to a metering screw.

The coal ash may be received inside a rotating drum of such vessel 25, and is subject to indirect heat as the rotating drum of vessel 25 is exposed to external heat. Vessel 25 is oriented or otherwise adapted to convey coal ash received therein through one or more heating zones, after which coal ash exits the rotating drum. In one version, the coal ash exits the rotating drum of a desorber or rotary calciner by means of another conveying device, such as a screw-type or other conveyor, such conveying device shown schematically below vessel 25 in FIG. 1.

Volatilization vessel or zone 25 may be in the form of a thermal desorber, such as a rotary kiln, a rotary calciner, or other form of rotary volatilization vessel. Volatilization vessel or zone 25 may be subjected to direct heat, that is, a flame within the drum or chamber acting on the quantity of coal ash received within the drum or chamber through direct contact or air or gas convection. Alternately, or in addition, the quantity of coal ash received in the drum or chamber of volatilization vessel 25 may be subjected to indirect heat, that is, heat supplied externally to the drum or chamber of volatilization vessel 25 into which the coal ash is received.

Coal ash suitable for processing according to this disclosure may have an LOI which varies depending on any number of factors, and accordingly, the corresponding bulk quantity or stream of the coal ash may be characterized by an average LOI, and deviations from such average LOI. If the bulk quantity of coal ash processed hereunder is from a single or similar production processes or single or similar coal stocks, the deviations from LOI average of the corresponding coal ash may be smaller and the process can reflect a coal ash stream having more consistent LOI across the bulk quantity being processed.

Coal ash having LOI of greater than 9% may be processed according to this disclosure and, during such processing, all or a portion of such coal ash may undergo a self-sustaining combustion reaction which removes carbon therefrom. In one possible implementation, the coal ash processing inducing such self-sustaining combustion may be efficiently and effectively accomplished within a rotary volatilization vessel 25 having a discharge rate ranging from 5 to 50 tons per hour, and such vessel may be of the type which exposes the coal ash stream to indirect heat, as discussed above. Coal ash having an LOI of carbon at 9% or less may also be processed according to this disclosure, such LOT generally making the coal ash difficult or unsuitable for self-sustaining combustion. For such LOI ranges, the coal ash stream may be received in the thermal desorber, such as a rotary kiln or rotary calciner in this implementation, and is subjected to at least one zone of heat ranging between 850° F. and 1200° F. This heat exposure occurs during an exposure time in a range of between 10 minutes and 30 minutes, so as to expose the coal ash to a non-self-sustaining sublimation of carbon therein. This sublimation is in contrast to self-sustaining combustion discussed above.

In one preferred implementation the exposure time of the process reduces the LOI of coal ash from between 3% and 9% to 3% or less. The rotary volatilization vessel, such as the rotary kiln or rotary calciner, uses indirect heat and such vessel may be separate from underlying, industrial process kilns. As such, one implementation of the disclosed process advantageously lowers LOI of coal ash without requiring rotary cement-making kilns or other direct-heat industrial process kilns which convey material in the presence of actual combustion. Furthermore, the indirect-heat, rotary volatilization vessels of the present implementation permit increased control of the heating zones in terms of both temperature and exposure times.

According to one possible process, the coal ash stream is subjected to an indirect sublimation heat ranging between 850° F. and 1200° F., and the range of exposure may be selected so as to remove at least 50% of the carbon from the coal ash, reducing the LOI of the coal ash to 3% or less, so that it is suitable as a supplementary cementitious material as a modified coal ash.

The following demonstrations were performed, consistent with the above described disclosure. Coal fly ash which is unsuitable for use as a cementitious material due to amount of ammonia present in the ash was processed. This same ash was also unsuitable for use as a cement kiln raw material due to the concentrations of mercury. In addition the process was also used to reduce LOI in the ash which makes it more marketable for the concrete industry. The test results are tabulated below:

TABLE 1

| parameter | Coal Fly Ash unprocessed result | units | Coal Fly Ash processed result | units | percent reduction result |
|---|---|---|---|---|---|
| Composite Sample 1 | | | | | |
| Loss on Ignition @ | 1.71 | % | 0.27 | % | 84.21% |
| Mercury | 40200 | ppb | <100 | ppb | 99.75% |
| Nitrogen | 353 | ppm | 32 | ppm | 71.67% |
| Composite Sample 2 | | | | | |
| Loss on Ignition @ | 1.86 | % | 0.43 | % | 76.88% |
| Mercury | 3870 | ppb | <100 | ppb | 97.42% |
| Nitrogen | 431 | ppm | 37 | ppm | 76.80% |
| Loss on Ignition @ | | | 0.21 | % | 88.71% |
| Mercury | | | <100 | ppb | 97.42% |
| Nitrogen | | | 44 | ppm | 76.80% |
| Composite Sample 3 | | | | | |
| Loss on Ignition @ | 1.74 | % | 0.21 | % | 87.93% |
| Mercury | 4140 | ppb | <100 | ppb | 97.58% |
| Nitrogen | 385 | ppm | 51 | ppm | 74.03% |
| Composite Sample 4 | | | | | |
| Loss on Ignition @ | 1.86 | % | 0.39 | % | 79.03% |
| Mercury | 1380 | ppb | <100 | ppb | 92.75% |
| Composite Sample 5 | | | | | |
| Loss on Ignition @ | 16.20 | % | 1.18 | % | 92.72% |
| Mercury | 1310 | ppb | <100 | ppb | 92.37% |
| Composite Sample 6 | | | | | |
| Loss on Ignition @ | 1.41 | % | 0.46 | % | 67.38% |
| Mercury | 1184 | ppb | <100 | ppb | 91.55% |
| Average of above Samples | | | | | |
| Loss on Ignition @ | 4.13 | % | 0.49 | % | 88.14% |
| Mercury | 8681 | ppb | <100 | ppb | 98.85% |
| Nitrogen | 390 | ppm | 40 | ppm | 89.73% |

Additionally, these same ashes were then used to demonstrate performance in concrete. Those results are shown below.

TABLE 2

| Sample | 7 Day PSI | 28 Day PSI | 7 Day SAI (%) | 28 Day SAI (%) | Water Req (%) | Air for 18% (g) |
|---|---|---|---|---|---|---|
| Control | 5450 | 6400 | — | — | — | 0.5690 |
| Composite #1 | 5120 | 6610 | 94 | 103 | 96 | 0.4094 |
| Composite #2 | 5420 | 7040 | 99 | 110 | 95 | 0.3806 |
| Composite #3 | 5160 | 6500 | 95 | 102 | 95 | 0.5285 |

Table 2 Definitions
PSI: Pound per Square Inch Compressive Strength
Water Req: Water Requirement
SAI: Strength Activity Index
Air for 18%: Air Entrainment The composites set out in Table 2, specifically, composites #1-3, comprise modified coal ash having LOI of carbon below 3 percent, ammonia below 60 ppm, and mercury below 100 PPB. As indicated by the PSI, SAI, Water Req, and Air for 18% tabulated in Table 2, the process for producing the modified coal ash was accomplished without unsafe exposures or conditions, and without compromising the suitability of the resulting, modified coal ash for other purposes. As such, the generated ash is undamaged and ready to be used, for example, as a cementitious material passing all necessary ASTM and market requirements.

Coal fly ash, when processed according to this implementation, may result in modified coal ash characterized by 80% of the modified coal ash particles passing through a 45 micron screen, such characteristics being achieved without additional pulverizing or screening steps. In the case of bottom ash or other coal ash having particles greater than 80 micron, the present implementation may include additional steps of pulverizing or screening, either the collected coal ash prior to its treatment steps, or performing such steps on the resultant modified coal ash after treatment as referenced above.

The systems and methods of the present disclosure may expose coal ash to one or more heat ranges over one or more ranges of time, to remove undesirable components of the coal ash and produce modified coal ash without the associated disadvantages of such undesirable components. In addition to lowering the LOI of carbon to below 3%, coal ash may be subjected to a temperature of 450° F. to 750° F., and for a time period ranging from 10 minutes to 20 minutes, the time period selected to reduce ammonia, which may be present in the coal ash, the reduction being such that the modified coal ash has 60 PPM or fewer ammonia therein. The exposure to heat in the above-recited temperature ranges causes ammonia present in the coal ash stream to gasify, and results in producing oxides and other effluents, which may be treated so as to reduce exposure risks. These same gases passing through the treatment system will result in emissions of N2 versus NOx.

In certain implementations, the above-disclosed processes may include limiting exposure of the coal ash to between 400 and 3000 cubic feet of air per minute. This limitation to air exposure may be advantageously accomplished when volatilization vessel 25 is in the form of a rotary calciner. The foregoing air exposure limitation may improve processing efficiency, especially when the carbon removal steps are combined with treatment steps for removing volatilized mercury, such as by means of a treatment unit 25 shown in FIG. 1.

When it is desirable to remove mercury from coal ash, such as reducing mercury from greater than 200 PPB to less than 100 PPB, the coal ash stream has been found to benefit from exposure to sublimation heat in the range of 650-850° F., preferably with a target or average temperature of about 672° F., that is, the sublimation temperature of mercury sulfide, and for an exposure time ranging from 20 to 30 minutes. In one possible protocol, the coal ash stream is first exposed to sublimation heat of 950° F. to 1150° F. for 10 minutes for the purpose of reducing the percentage LOI of carbon at the outset of the process, and the coal ash stream is then subsequently exposed to the lower, gasifying temperature of 650 to 850° F. for purposes of volatilizing mercury and 450° F. to 750° F. for gasifying ammonia, such lower temperature exposures occurring over a time period ranging from an additional 10 to 20 minutes beyond the initial 10 minutes used for sublimating the carbon.

In addition to temperature ranges and exposure times as disclosed above, the rotation of rotary volatilization vessel 25 turns over CCR, such as coal ash, received therein. As such, the CCR/coal ash is exposed not only to the heated environment of the vessel 25 but to the carrying gas stream from gasification of heavy metal and/or ammonia. The oxygen in such gas stream will contribute to carbon sublimation (or combustion) upon contact with the carbon, contributing to reduction of LOI percentage. Still further rotation of vessel 25 may be varied, depending on the application, to achieve desired LOI or other characteristics of the modified coal ash exiting vessel 25. Suitable rotation rates may range from ½ RPM to 10 RPM dependent upon vessel design and as required to achieve targeted retention times. It will be appreciated that one or more exhaust ports, channels, or conduits (shown schematically at 29) are provided in communication with the rotary volatilization vessel to carry off, for subsequent treatment as needed, the gasified ammonia, volatilized mercury, or other airborne components formed during treatment of the modified coal ash hereunder.

Operation of the system and related processes according to this disclosure are readily apparent from the foregoing description. In one possible implementation, coal ash, including coal fly ash and/or bottom ash, is collected in bulk quantity and subjected to sublimation heat, preferably indirect in nature, and having a temperature greater than 850° F. and less than 1200° F. In one particular implementation, the collected coal ash is inserted into a rotary calciner as a coal ash stream and exposed to heat range greater than 900° F. and less than 1150° F. as shown in Table 3 below. In still another implementation, the temperature of the heat is maintained within ±50° F. of an average of 950° F.

TABLE 3

|  | Coal Fly Ash unprocessed | | Coal Fly Ash processed | | percent reduction |
| --- | --- | --- | --- | --- | --- |
|  | result | units | result | units | result |
| Coal Fly Ash 1 @ 950 F. | | | | | |
| Loss on Ignition @ | 8.37 | % | 2.10 | % | 74.91% |
| Coal Fly Ash 2 @ 1150 F. | | | | | |
| Loss on Ignition @ | 10.60 | % | 3.00 | % | 71.70% |
| Coal Fly Ash 3 @ 1100 F. | | | | | |
| Loss on Ignition @ | 8.00 | % | 1.26 | % | 84.25% |
| Coal Fly Ash 4 @ 950 F. | | | | | |
| Loss on Ignition @ | 1.79 | % | 0.30 | % | 83.15% |

The process according to this disclosure may include further, optional steps. So, in one approach, target temperatures for a particular ash may be determined or estimated in advance of subjecting the bulk quantity of the coal ash or the coal ash stream to the heating steps or exposure times referenced herein. Such advance determination or estimation may involve application of a temperature ladder for subjecting samples of the coal ash stream to be processed to heat at a plurality of specific temperatures and maintain such temperatures, for a period of 30-60 minutes. LOI for each ash is tested before and after each specific temperature step, such steps being, for example, increments of between 50-100 degrees Fahrenheit. The change in LOI at different steps comprise data which may be used to target or estimate a temperature within the range of 850° to 1200° F. to achieve a target reduction of the LOI for the modified coal ash to be produced. In addition, it is possible that such temperature ladder may determine if a particular ash is suitable for processing disclosed herein.

Heat, according to this implementation, whether direct or indirect, may be limited to a maximum temperature so as to maintain the rotary volatilization vessel, such as the rotary calciner, substantially free of fused silicates. Formation of such fused components is undesirable and interferes with the carbon reduction processes associated with treating the coal ash and producing modified coal ash suitable for use as a supplementary cementitious material.

Although the treatment systems and methods have been described and illustrated in connection with certain embodiments, many variations and modifications will be evident to those skilled in the art and may be made without departing from the spirit and scope of the invention.

The disclosure is thus not to be limited to the precise details, methodology or construction set forth above, as such variations and modifications are intended to be included within the scope of the disclosure.

What is claimed is:

1. A process for producing a modified coal ash, the process comprising:

providing a coal ash storage container having a feed mechanism adapted to deliver a coal ash stream;

providing a rotary volatilization vessel having an inlet in communication with the feed mechanism, the rotary volatilization vessel having multiple, independent heat zones, the rotary volatilization vessel having an inlet end to receive the coal ash stream, a discharge end, and multiple independent heat zones to expose the coal ash stream to indirect heat while in the rotary volatilization vessel, the rotary volatilization vessel having a discharge rate selectively variable between 5 to 50 tons per hour;

providing a treatment unit in pneumatic communication with the rotary volatilization vessel to receive a stream of heavy metal volatilized from the coal ash, the treatment unit having a treatment chamber defined therein, the treatment chamber having an inlet adapted to receive a treating solution there through in sufficient amounts to contact the volatilized heavy metal stream and form heavy metal precipitate, the treatment chamber having an exhaust port through which exits gasified compounds formed within the chamber during heating of the coal ash;

collecting a bulk quantity of the coal ash, the coal ash having been previously generated by combustion of coal, the coal ash having 9% LOI of carbon or less;

forming the collected coal ash into the coal ash stream;

removing at least 50% of the carbon from the coal ash in a non-self-sustaining sublimation of the carbon, by subjecting the coal ash stream to a sublimation heat, in the rotary volatilization vessel, wherein the heat ranges between 850° F. and 1200° F. and during an exposure time in a range between 10 minutes and 30 minutes;

selecting the range of the exposure time to reduce the LOI of the coal ash to 3% or less; and removing the coal ash stream from the sublimation heat upon completion of the selected exposure time to form the modified coal ash.

2. The process of claim 1, wherein the coal ash comprises bottom ash characterized by having particles greater than 80 microns, and further comprising pulverizing or screening at least one of the collected coal ash and the modified coal ash to form particles of the modified coal ash characterized by 80% of the modified coal ash particles passing through a 45 micron screen.

3. The process of claim 1, wherein the collecting step comprises collecting a bulk quantity of the coal ash having heavy metal associated therewith, and further comprising the steps of separating the heavy metal from the coal ash by volatilizing the heavy metal while subjecting the coal ash to the sublimation heat, and treating the volatilized heavy metal with at least one of an alkaline-earth metal sulfide or alkaline-earth metal polysulfide.

4. The process of claim 1, further comprising the step of limiting exposure of the coal ash to between 400 and 3000 cubic feet of air per minute during the selected range of the exposure time.

5. The process of claim 1, further comprising the step of inserting the collected coal ash into a rotary volatilization vessel.

6. The process of claim 5, wherein the step of inserting the collected coal ash into the rotary volatilization vessel comprises inserting the coal ash stream into one of a rotary kiln and a rotary calciner.

7. The process of claim 1, wherein the step of collecting comprises collecting a bulk quantity of coal fly ash.

8. The process of claim 1, wherein the step of collecting comprises collecting a bulk quantity of coal ash having 6% to 9% LOI of carbon and 60 or greater ppm of ammonia.

9. The process of claim 8, wherein, after subjecting the coal ash stream to the sublimation heat for the selected range of the exposure time, the coal ash stream is exposed to a gasifying heat having a temperature of 450° F. to 750° F. for a time period ranging from 10 minutes to 20 minutes, wherein the time period is selected to reduce the ammonia in the modified coal ash to 60 ppm or fewer.

10. A process for producing a modified coal ash, the process comprising:

providing a coal ash storage container having a feed mechanism adapted to deliver a coal ash stream;

providing a rotary volatilization vessel having an inlet in communication with the feed mechanism, the rotary volatilization vessel having multiple, independent heat zones, the rotary volatilization vessel having an inlet end to receive the coal ash stream, a discharge end, and multiple independent heat zones to expose the coal ash stream to indirect heat while in the rotary volatilization vessel, the rotary volatilization vessel having a discharge rate selectively variable between 5 to 50 tons per hour;

providing a treatment unit in pneumatic communication with the rotary volatilization vessel to receive a stream of heavy metal volatilized from the coal ash, the treatment unit having a treatment chamber defined therein, the treatment chamber having an inlet adapted to receive a treating solution there through in sufficient amounts to contact the volatilized heavy metal stream and form heavy metal precipitate, the treatment chamber having an exhaust port through which exits gasified compounds formed within the chamber during heating of the coal ash;

collecting a bulk quantity of coal ash, the coal ash having been previously generated by combustion of coal, the quantity of the coal ash having 6% or greater LOI of carbon;

inserting the collected coal ash as a coal ash stream into the rotary volatilization vessel;

subjecting the coal ash stream, while in the rotary volatilization vessel, to an indirect heat during an exposure time ranging from 10 minutes to 30 minutes and having a temperature selected to be sufficiently high to remove carbon from the coal ash stream by at least one of sublimation or combustion and sufficiently low to maintain the rotary volatilization vessel substantially free of fused silicates;

limiting exposure of the coal ash to between 900 and 3000 cubic feet of air per minute while in the rotary volatilization vessel; and discharging the coal ash from the rotary volatilization vessel at a discharge rate ranging between 5 to 50 tons per hour upon completion of the exposure time to form the modified coal ash; whereby the LOI of carbon of the modified coal ash is 3% or less.

11. The process of claim 10, wherein the collecting step comprises collecting a bulk quantity of the coal ash having heavy metal associated therewith, and further comprising the steps of separating the heavy metal from the coal ash by volatilizing the heavy metal while performing the step of applying the indirect heat to the coal ash, and treating the volatilized heavy metal with at least one of an alkaline-earth metal sulfide or alkaline-earth metal polysulfide.

12. The process of claim 10, wherein the step of applying the indirect heat further includes limiting the temperature to a maximum temperature.

13. The process of claim 10, wherein the temperature is between 850° F. and 1200° F.

14. The process of claim 10, wherein the step of subjecting the coal ash stream to heat comprises substantially combusting the carbon in the coal ash stream.

15. The process of claim 14, wherein the step of collecting the coal ash comprises collecting the bulk quantity to have an average LOI of carbon of greater than 9%.

16. The process of claim 10, wherein the step of subjecting the coal ash stream to heat comprises substantially sublimating the carbon.

17. The process of claim 16, wherein the step of collecting the coal ash comprises collecting the bulk quantity to have an average LOI of carbon of 9% or less.

18. The process of claim 10, further comprising performing at least one step of pulverizing or screening, wherein said at least one step is performed prior to the inserting step on the coal ash or after the discharging step on the modified coal ash, to form modified coal ash particles, wherein 80% of the modified coal ash particles pass through a 45 micron screen.

19. The process of claim 10, wherein the step of collecting the bulk quantity comprises collecting a bulk quantity of coal ash consisting substantially of coal fly ash.

20. A process for producing a modified coal ash, the process comprising:

providing a coal ash storage container having a feed mechanism adapted to deliver a coal ash stream;

providing a rotary volatilization vessel having an inlet in communication with the feed mechanism, the rotary volatilization vessel having multiple, independent heat zones, the rotary volatilization vessel having an inlet end to receive the coal ash stream, a discharge end, and multiple independent heat zones to expose the coal ash stream to indirect heat while in the rotary volatilization vessel, the rotary volatilization vessel having a discharge rate selectively variable between 5 to 50 tons per hour;

providing a treatment unit in pneumatic communication with the rotary volatilization vessel to receive a stream of heavy metal volatilized from the coal ash, the treatment unit having a treatment chamber defined therein, the treatment chamber having an inlet adapted to receive a treating solution there through in sufficient amounts to contact the volatilized heavy metal stream and form heavy metal precipitate, the treatment chamber having an exhaust port through which exit gasified compounds formed within the chamber during heating of the coal ash;

collecting a bulk quantity of coal ash, the coal ash having been previously generated by combustion of coal, the quantity of the coal ash having at least one of the characteristics of 6% or greater LOI of carbon and 60 ppm or greater of ammonia;

inserting the collected coal ash as the coal ash stream into the rotary volatilization vessel;

subjecting the coal ash stream, while in the rotary volatilization vessel, to at least one of the following heating steps:
(i) an indirect, sublimating heat having a temperature greater than 850° F. and less than 1200° F. and during a first, associated exposure time ranging from 10 minutes to 30 minutes, wherein the temperature and exposure time are selected to reduce the LOI of carbon to less than 3%; and
(ii) a gasifying heat having a temperature of 450° F. to 750° F. and during a second, associated exposure time ranging from 10 minutes to 20 minutes, wherein the temperature and exposure time are selected to reduce the ammonia to 60 ppm or less;

limiting exposure of the coal ash to between 400 and 3000 cubic feet of air per minute while in the rotary volatilization vessel; and discharging the coal ash from the rotary volatilization vessel at a discharge rate ranging between 5 to 50 tons per hour upon completion of the indirect and gasifying heating steps to form the modified coal ash.

21. A system for producing a modified coal ash, the system comprising:
a coal ash storage container having a feed mechanism adapted to deliver a coal ash stream;
a rotary volatilization vessel having an inlet in communication with the feed mechanism, the rotary volatilization vessel having multiple, independent heat zones, the rotary volatilization vessel having an inlet end to receive the coal ash stream, a discharge end, and multiple independent heat zones to expose the coal ash stream to indirect heat while in the rotary volatilization vessel, the rotary volatilization vessel having a discharge rate selectively variable between 5 to 50 tons per hour; and
a treatment unit in pneumatic communication with the rotary volatilization vessel to receive a stream of heavy metal volatilized from the coal ash, the treatment unit having a treatment chamber defined therein, the treatment chamber having an inlet adapted to receive a treating solution there through in sufficient amounts to contact the volatilized heavy metal stream and form heavy metal precipitate, the treatment chamber having an exhaust port through which exit gasified compounds formed within the chamber during heating of the coal ash.

22. The system of claim 21, wherein the coal ash stream comprises coal ash having 9% Loss on Ignition (LOI) of carbon or less.

23. The system of claim 21, wherein the rotary volatilization vessel is configured to remove at least 50% of the carbon from the coal ash stream.

24. The system of claim 21, wherein the rotary volatilization vessel is configured to provide for a temperature range between 850° F. and 1200° F. in the multiple independent heat zones.

25. The system of claim 21, wherein the rotary volatilization vessel is configured to provide for a selection of a range of an exposure time to reduce Loss on Ignition (LOI) of coal ash in the coal ash stream to 3% or less.

26. The system of claim 21, wherein the treatment unit is configured to receive the treating solution comprising an alkaline-earth metal sulfide or alkaline-earth metal polysulfide.

* * * * *